United States Patent
Tuukkanen et al.

(10) Patent No.: US 8,841,798 B2
(45) Date of Patent: Sep. 23, 2014

(54) METHOD, APPARATUS FOR EMERGENCY POWER SUPPLY AND DEVICE ASSOCIATED THERETO

(75) Inventors: Marko Tapio Tuukkanen, Berlin (DE); Markus Antti Tapio Aaltonen, Piikkio (FI)

(73) Assignee: Navteq B.V., Veldhoven (NL)

( * ) Notice: Subject to any disclaimer, the term of this patent is extended or adjusted under 35 U.S.C. 154(b) by 531 days.

(21) Appl. No.: 13/309,746

(22) Filed: Dec. 2, 2011

(65) Prior Publication Data

US 2013/0140899 A1    Jun. 6, 2013

(51) Int. Cl.
*H02J 7/02* (2006.01)
*H02J 9/00* (2006.01)

(52) U.S. Cl.
CPC .... *H02J 7/02* (2013.01); *H02J 9/00* (2013.01)
USPC ............... 307/66; 307/65; 320/103; 320/111; 320/115; 320/138

(58) Field of Classification Search
CPC .................................. H02J 7/02; H02J 9/00
USPC .......................................................... 307/66
See application file for complete search history.

(56) References Cited

U.S. PATENT DOCUMENTS 6,304,171 B2   10/2001   Seto
2010/0124896 A1   5/2010   Kumar

FOREIGN PATENT DOCUMENTS

CN   2664257 Y   12/2004
WO   2008/058557 A1   5/2008

OTHER PUBLICATIONS

"Power Block Reserve", AC charger and rechargeable backup battery, Griffin Technology, Retrieved on Apr. 2, 2013, Webpage available at: http://store.griffintechnology.com/powerblock-reserve-1.

*Primary Examiner* — Hal Kaplan
(74) *Attorney, Agent, or Firm* — Nokia Corporation

(57) ABSTRACT

An apparatus comprises a transformer coupled to a mains power, a backup power source comprising a first battery, a first power supply line switch configured to switch the power source between the backup power source and the mains power, a connecting interface coupling the power source to an external electronic device comprising a second battery which is rechargeable and a second power supply line switch which is configured such that the external electronic device is able to be powered by either the power source or a second battery, and a charging detector configured to detect the availability of the mains power, wherein the first power supply line switch is further configured to couple the backup power source to the external electronic device via the connecting interface when the mains power is not available such that the first battery is able to deliver power to the external electronic device.

20 Claims, 5 Drawing Sheets

METHOD, APPARATUS FOR EMERGENCY POWER SUPPLY AND DEVICE ASSOCIATED THERETO

TECHNICAL FIELD

The present application generally relates to power supply and management of electronic devices, especially in emergency situations.

BACKGROUND

Portable electronic devices for example mobile phones play an important role in many emergency situations. A simple phone call or a short message at an earliest time could save lives and change situations. Many of the portable electronic devices are power supplied by a rechargeable battery. The availability of the battery power is a crucial point for employing the portable electronic devices. Users always feel frustrated when a device is not available because of an empty battery. Users may even feel as if their chargeable devices with empty batteries are next to worthless during mains power blackout.

Currently there are many different existing backup power solutions and devices which can be used to provide electricity during mains power blackout. For example, diesel fueled aggregate units commonly called uninterruptible power supply (UPS). Such emergency power unit is driven by diesel fuel and starts up within the first seconds of a blackout. This solution is expensive and also heavily depends on the amount of fuel available in the aggregate unit. Another available solution is to use special battery units designed to recharge the chargeable battery without an actual charger. Users can plug the special battery units into the charge port of the device, and then from there the users will be able to give the device for example an hour extra running time. Such kind of special battery units are normally disposable and pricey which are not commonly used by the consumers. Users can also bring spare rechargeable battery units which can replace or recharge the original battery of the device. In this case the users consume the energy from the backup battery for all kinds of functions including emergency use when it is needed. The users need to remember of recharging the battery in regular basis because battery self-discharge and unit leakage current will slowly discharge the battery. As a battery ages, the users also need to keep track the status of battery by themselves and make sure the backup battery is ready to use when it is needed.

SUMMARY

Various aspects of examples of the invention are set out in the claims. This section is intended to be a non-limiting overview of exemplary embodiments.

In an exemplary embodiment, there is a provided apparatus comprising a transformer coupled to a mains power, a backup power source comprising a first battery, a first power supply line switch configured to switch the power source between the backup power source and the mains power, a connecting interface coupling the power source to an external electronic device, wherein the external electronic device comprises a second battery which is rechargeable and a second power supply line switch which is configured such that the external electronic device is able to be powered by either the power source or a second battery. The provided apparatus further comprises a charging detector configured to detect the availability of the mains power, wherein the first power supply line switch is further configured to couple the backup power source to the external electronic device via the connecting interface when the mains power is not available such that the first battery is able to deliver power to the external electronic device.

In another exemplary embodiment, there is a provided method comprising coupling a connecting interface to an external electronic device, detecting a charging status based partially at least on the availability of mains power coupled to a transformer, and coupling a first battery inside a charger as the external power source to the external electronic device when the mains power is not available, wherein the external electronic device comprises a second battery which is rechargeable and a second power supply line switch which is configured such that the external electronic device is able to be powered by either the second battery or an external power source.

In a third exemplary embodiment, there is a provided device comprising an internal rechargeable battery, a charging detector coupled to an external power supply via a connecting interface, wherein the external power supply comprises a transformer coupled to a mains power and a backup power source comprising a battery. The charging detector is further configured to detect the availability of the mains power to the external power supply. The provided device further comprises an internal power supply line switch configured to couple the backup power source to the device such that the device is able to power up by the first battery inside the external power supply when the mains power is not available. The provided device is configured to be powered by either the internal rechargeable battery or the external power supply controlled by the internal power supply line switch.

In a fourth exemplary embodiment, there is a provided method comprising detecting an emergency status of a device via a connecting interface to an external power supply based partially at least on the availability of mains power, wherein the external power supply comprises a battery and a transformer coupled to a mains power, and the device comprises a internal rechargeable battery and an internal power supply line switched configured such that the external electronic device is powered by either the external power supply or the internal rechargeable battery. The provided method further comprises coupling the battery in the external power supply to the device when the internal rechargeable battery of the device is low or empty and the mains power is not available such that the battery in the external power supply is able to supply power to the device.

In a fifth exemplary embodiment, there is a provided computer program product comprising a computer-readable medium bearing computer program code embodied therein for use with a computer, wherein the computer program code comprises code for detecting a charger connection for mains power, code for detecting the remaining power of a rechargeable battery in an external electronic device, code for controlling power delivery from a battery in the charger directly to the external electronic device for running an emergency application when the mains power is not available and the remaining power of the rechargeable battery in the external electronic device is low or empty or in terms of a user's interaction, and code for enabling power saving scheme in the external electronic device if the power is delivered directly from the battery of the charger, wherein the charger is coupled to the external electronic device via a connecting interface and said connecting interface is further coupled to the mains power via a transformer.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Some exemplary embodiments of the present invention and its potential advantages are understood by referring to FIGS. 1 through 5 of the drawings.

Figure 1:
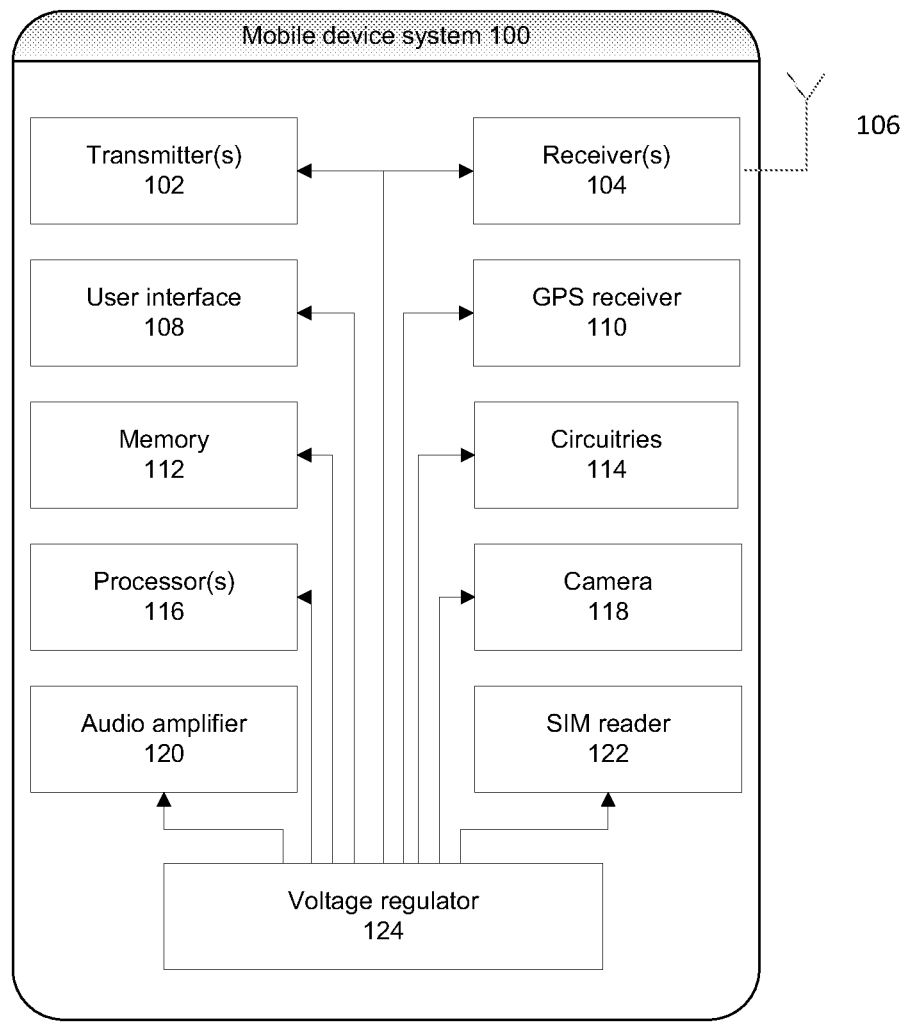
FIG. 1 is a block diagram of an electronic device system according to an exemplary embodiment.

FIG. 1 is a block diagram of an electronic device system according to an exemplary embodiment. In an example embodiment, the electronic device may be a mobile device, such as mobile device 100. A mobile device system 100 comprises one or more transmitters 102 and receivers 104 for transmitting and receiving data. In an embodiment, the mobile device system 100 comprises one or more antenna 106 serving the purpose of transmitting and receiving data. The mobile device system 100 may further comprise a user interface 108, including but not limited to a graphical user interface. The mobile device system 100 may further comprise one or more elements for determination of location or velocity of motion, including but not limited to a GPS (global positioning system) receiver 110 and the GPS circuit in circuitries 114. The mobile device system 100 may further comprise one or more memories 112 for data and application storage and some other functional elements, for example, a camera 118, one or more subscriber identification module (SIM) card reader 122, and audio amplifier 120 for driving loud speaker or an earphone. The one or more processors 160 execute instructions including but not limited to the energy management for driving the mobile device system 100 with various functions. The circuitries 114 may further comprise camera circuitry, smart card reader circuitry, and/or audio circuitry. Different functional elements in the systems have their own operating voltages. A voltage regulator 124 in the mobile device system 100 stabilizes and regulates the direct current (DC) voltage from either a battery in the mobile device or en external power supply so that each functional element receives a steady voltage with a proper level independent of how much power is drawn from the power source. For example, a lithium-ion battery has an output voltage up to 4.2 V. In the event of the SIM card being powered in 1.8V or 3V, the output voltage of the lithium-ion battery needs to be downconverted to 1.8V or 3V so that the SIM card can be properly operated.

A rechargeable battery is a very common power source to an electronic device, for example a mobile phone. The mobile phone works in amount of the current battery charge. When a rechargable battery is drained in an emergency situation, it is very common that user is first looking for a charger in order to start up the device. In case of mains power blackout, the mobile phone operator networks are still working on backup power, but it is not possible to charge and power on the phone using a normal charger. In this case, it is not possible to make a call or leave SMS message even though it is important to call during an emergency or to leave OK message for concerned family.

It is desirable to achieve a backup power which is reliable and available in all kinds of emergency situations. It may be feasible but not practical to put a second battery inside a mobile phone which would only be used for emergency purposes. The reason is that the mobile phone device with a second battery would simply become too big and thick. At the moment, all the mobile phone manufacturers are very much challenged from operators about the thickness of the mobile device. For example, adding a typical 1000 mAh battery into a product will increase the product thickness of about 6 mm. Another limiting factor is that some phones do not have a user replaceable battery. In this case a spare battery is not the solution. However, the charger form factor is not so critical at the moment. Mobile chargers and especially universal serial bus (USB)-chargers are commonly provided to the consumers with the purchase of a mobile device and majority of consumers in Europe, the United States and Asia already own more than one mobile charger, and generally available to be used with mobile devices. Based on that it may be feasible to put an emergency battery which could be a small battery or an energy capacitor or a supercapacitor connected in parallel with a small battery in the charger to keep enough electric current for a minimum of one phone call, about 5 minutes minimum, or additionally enough for sending text message or sharing location.

Figure 2:
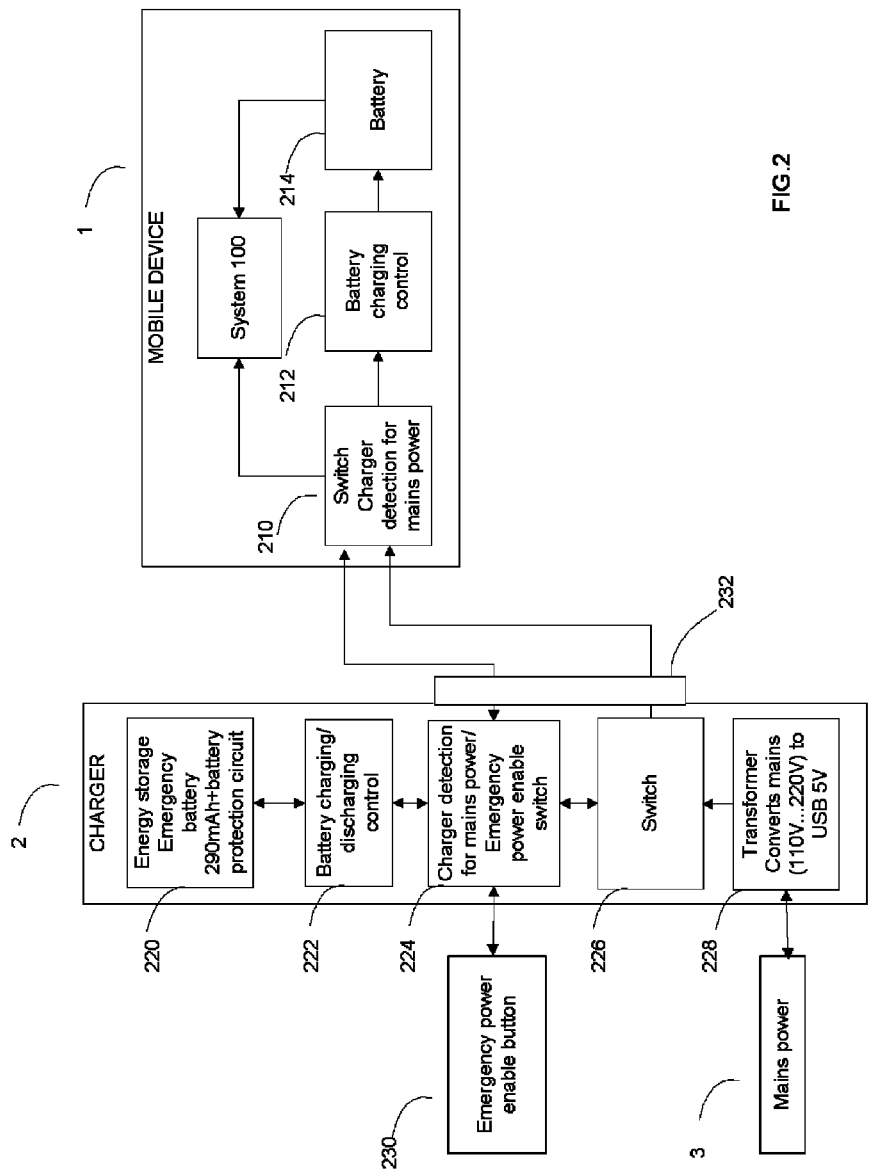
FIG. 2 is a block diagram of a charging system in connection to a rechargeable electronic device according to an exemplary embodiment.

FIG. 2 is a block diagram of a charging system in connection to a rechargeable electronic device according to an exemplary embodiment.

A charging system for example a charger is a power source to a rechargeable electronic device. In this exemplary embodiment, the rechargeable electronic device is a mobile device 1 comprising a mobile device system 100, a connector 210 to the charger 2 comprising a switch and a charger detection unit for mains power, a battery charging control unit 212 and a rechargeable battery 214. The mobile device could be a mobile phone, a laptop computer, a tablet computer or other devices. In another exemplary embodiment, the battery charging control unit 212 may be included in the power management unit of the mobile device 1.

The charger 2 comprises a backup power source 220 comprising an energy storage emergency battery. The backup power source 220 may further comprise a corresponding battery protection circuit. In case of GSM (global system for mobile communications) system, a phone call is started with a maximum power level of 33 dBm (in decibels (dB) referenced to one milliwatt (mW)) which consumes around 2 A (ampere) peak current from battery. Depending on the network conditions, the power level can be either full power or lower. Average GSM current consumption is around 170 mA (milliampere) and WCDMA 190 mA. This means that theoretically 10 minutes power capacity for consumption in GSM system is around 29 mAh (milliampere per hour) (i.e. 10 minutes/60 minutes*170 mA). A battery with power capacity 29 mAh would be of very small size, but the peak current might be relatively high which means 29 mAh size battery has difficulties to deliver the around 2 A peak current during a GSM call. For a 29 mAh battery, the discharge rate is C=0.029

A per hour. A discharging rate of 69C=2 A would need around 1 minute to fully discharge the battery. At the moment there are no lithium-ion based batteries available for delivering 69C discharge current. Realistic limit at the moment is around 45C. Based on the above and to have margin against the peak current it is preferably to use a higher battery capacity for example 10 times higher battery capacity, i.e. 290 mAh. In this example, the discharge rate would be in a reasonable level ~7C. There are many batteries available at the moment that support 7C discharge rate. The battery 220 which is located inside the charger 2 is configured to supply power to the mobile device 1 and keep the mobile device 1 alive with or without charging a certain amount of energy to the rechargeable battery 214. Taking account the design of charger for small size, lithium-ion battery's high current discharge capability, the voltage or IR drop between the charger 2 and possible low temperature environment to the battery 214 inside the mobile device 1, it is recommended to have a battery capacity of at least 100 mAh to 300 mAh inside the charger 2. According to an exemplary embodiment, the emergency battery 220 inside the charger 2 is a rechargeable battery. According to another exemplary embodiment, the integrated battery 220 is replaceable when it has reached its expected life time or the battery 220 is not fully or at all usable. It is possible to detect the state and condition of the emergency battery 220 with software that is running on the mobile device 1. When user plugs the charger 2 into the mobile device 1, the device 1 notifies the user if the emergency battery 220 is worn and needs to be replaced.

A battery made of lithium-ion cells always has a battery protection circuit, for example a passive fuse or a positive temperature coefficient (PTC) device, connected between the negative pole of the emergency battery and the positive pole of the charger 2 which is further connected to the mobile device 1. The purpose of the battery protection circuit is to limit the emergency battery discharge current to a reasonable level and protect safety hazards in case of misuse or in malfunction (short circuit) during an emergency use of the mobile device 1.

The charger 2 further comprises a transformer 228 converting the supply voltage from mains power 3 to a low voltage level suitable for an application device for example a USB charger with an output voltage of 5V, and a battery charging/discharging control unit 222. The battery charging/discharging control unit 222 comprises a battery charging integrated circuit (IC) (not shown). One cell lithium-ion battery charging ICs are commercially available which may be placed inside the charger 2 to ensure that the lithium-ion battery 220 is fully charged when the charger 2 is connected to mains 3. When the charger is disconnected from mains 3, the lithium-ion charging IC will enter to a special low power mode where the current consumption on the battery charging IC is minimized to keep the integrated emergency battery 220 charged as long as possible. The battery charging control 212 inside the mobile device 1 has a similar function as the unit 222 from the charging control perspective.

In normal use cases, the use of the emergency battery 220 inside the charger 2 should be prevented to ensure that the emergency battery 220 is fully charged. The emergency battery 220 should be only available in emergency situations.

In an exemplary embodiment, the charger 2 has a mechanical switch 230 for example a button on the surface which is enabled to be turned on by the user in emergency situations when the mobile device battery 214 is empty. Emergency situations may be that there is a power blackout when the charger 2 is plugged in the mains 3 or no connection to the power grid. This may be detected by the charger detection unit for mains power 224 inside the charger 2. The charger 2 further communicates this status to the mobile device 1 which is intended to be charged via a connecting interface 232. The connecting interface 232 couples the charger 2 with the mobile device 1 wirelessly or via a cable. If the mobile device 1 is powered on, the mobile device will then enable a power saving scheme in the mobile device 1. The power saving scheme may include any necessary steps to save the available power to the mobile device 1 for example turning off all widgets, games, reducing the brightness of screen etc. In an emergency situation, by pressing the button 230 in the charger 2, it may notify the user of the device battery's status on a display of the mobile device 1 and asking if the user wants to make an emergency call. In case the display of the mobile device 1 is broken or the screen is shut down in a power saving scheme, there is nothing to display on the screen. In this case pressing the button 230 may directly initiate an emergency call from the mobile device 1 as long as the device 1 is connected to communication network.

In an exemplary embodiment, an emergency power enable switch 230 is built in the charger detection unit for mains power 224 inside the charger 2. In this case during mains blackout, the mobile device 1 needs to be powered on by either the internal battery 214 with a low level voltage or the emergency battery 220 inside the charger. The mobile device will then enables a power saving scheme in the mobile device 1, notifying the user the current status of charging and requesting a user's interaction, and then waiting for user's confirmation whether to allow the device 1 using the charger's integrated battery 220 for emergency application only.

In an exemplary embodiment, there is a built-in charger detection unit for mains power 210 inside the mobile device 1. Using software in the power management unit of the mobile device 1, it is possible to detect connection to the mains power 3 through the charger by the software. If power blackout or lack of connection to the power grid is detected by the software, the mobile device 1 enables a power saving scheme in the mobile device 1, notifies the user of the charger status at the user interface 108 and request a user's interaction, and then waiting for user's confirmation whether to allow the device 1 using the charger's integrated battery 220 for emergency application only.

After the user has confirmed to use the emergency battery 220 inside the charger 2 by either physically turning on the mechanical emergency power button 230 or responding the requesting through the user interface 108 of the mobile device 1, a switch 226 inside the charger 2 will disconnect the power supply from the transformer 228 and connect the power supply line from the emergency battery 220 into the connector 210 of the mobile device 1 via the connector interface (232). In a preferable exemplary embodiment, another switch insider the connector 210 of the mobile device 1 will also switch the power line directly to the mobile device system 100. This way the emergency battery 220 inside the charger 2 provides power directly to emergency functions of the system 100. A potential energy waste on the charging IC 212 to the internal battery 214 of the mobile device 1 can be saved. In another exemplary embodiment, the switch inside the connector 210 of the mobile device 1 enables continuous charging of the internal battery 214. This is not recommended for emergency situations but respects the user's preference for example when user knows there will be soon mains power available or it is not really an emergency situation. In this case the mobile device 1 may support all the other functions in addition to the emergency functions. The emergency functions may include but not limited any of making a phone call, sending an SMS message, or sharing the location.

There are many considerations in the design of a charging system integrated with an emergency battery, for example, the voltage or IR drop between charger and device battery should be minimized. The charger wire connected to the phone device and other internal electronics should be optimized. The user manual should have instructions for using battery in the charger in emergency situations.

Figure 3:
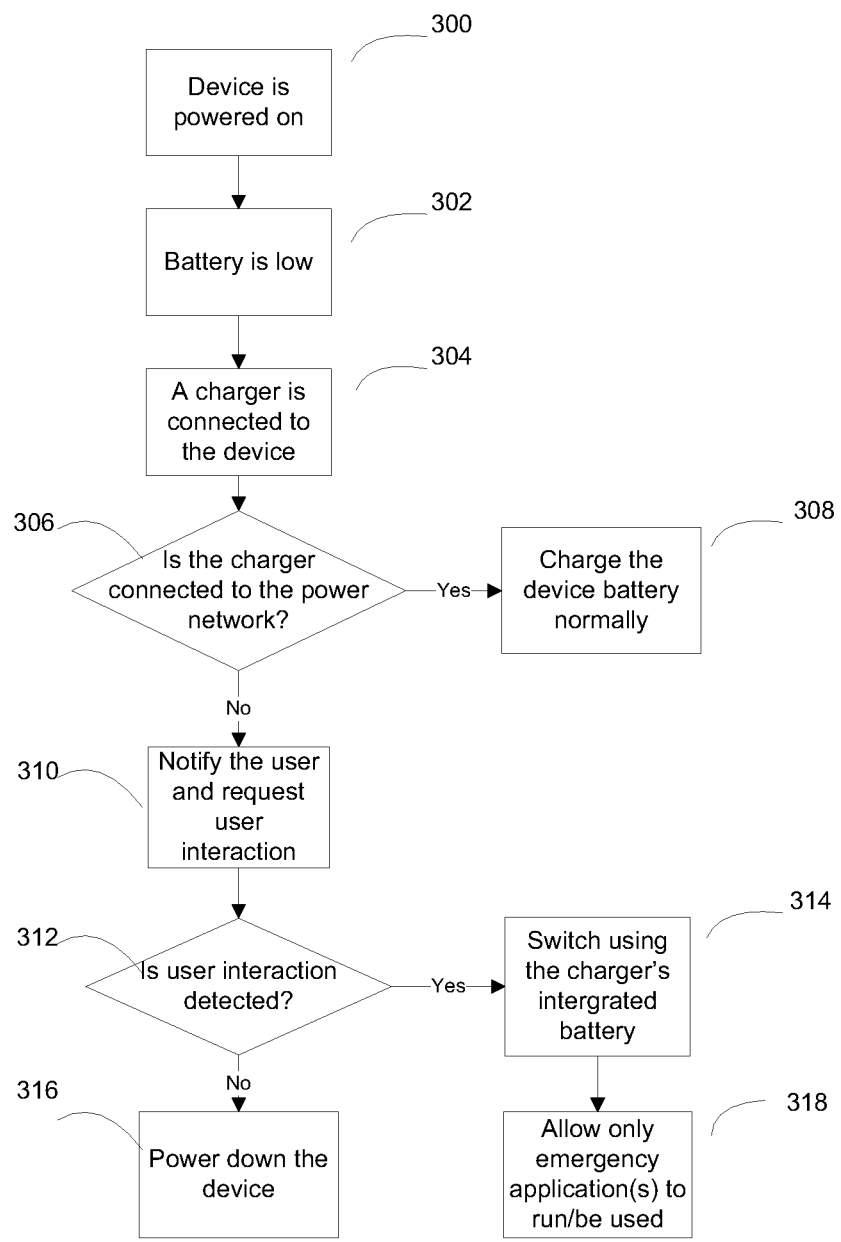
FIG. 3 is a flow diagram showing operations for emergency power supply when an electronic device is powered on and the battery in the device is low according to an exemplary embodiment.

FIG. 3 is a flow diagram showing operations for emergency power supply when an electronic device is powered on and the battery in the device is low according to an exemplary embodiment. In a situation that a device with a rechargeable internal battery is powered on at 300, and a low battery is detected at 302, a charger with an integrated emergency battery according to any of exemplary embodiments is connected to the device at 304. The charger or the device detects whether the charger is connected to the power grid at 306 according to any of the exemplary embodiments. If it is detected that the mains power is available, the charger charges the device battery normally at 308. Otherwise, the device notifies the user the situation and requests a user's interaction at 310. The user's interaction is detected at 312. If the user confirms of an emergency situation, the power supply lines in both the charger and the device are switched such that the charger's integrated battery can be used to power up the device at 314 for emergency functions use only at 318. If no user's interaction is detected, the device assumes no emergency use of the device is needed and simply powers down the device at 316.

Figure 4:
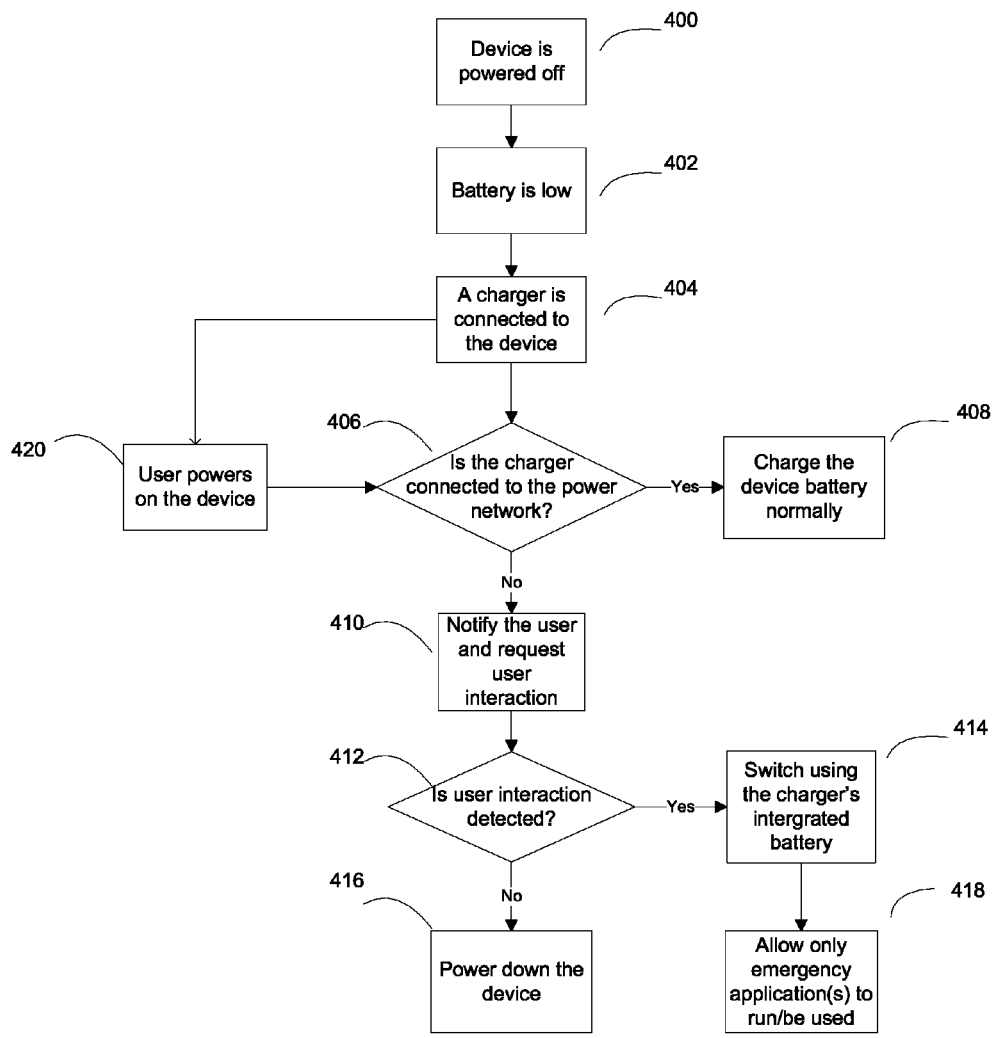
FIG. 4 is a flow diagram showing operations for emergency power supply when an electronic device is powered off and the battery in the device is low according to an exemplary embodiment.

FIG. 4 is a flow diagram showing operations for emergency power supply when an electronic device is powered off and the battery in the device is low according to an exemplary embodiment. In a situation that a device with a rechargeable internal battery is powered off at 400, and a low battery is detected at 402, a charger with an integrated emergency battery according to any of the exemplary embodiments is connected to the device at 404. The charger or the device detects whether the charger is connected to the power grid at 406 according to any of the exemplary embodiments. The device needs to be powered on at 420 if it is used to detect the charger's connection to the power grid at 406. If the mains power is available, the charger charges the device battery normally at 408. Otherwise, the device notifies the user the situation and requests a user's interaction at 410. The user's interaction is detected at 412. If the user confirms of an emergency situation, the power supply lines in both the charger and the device are switched such that the charger's integrated battery can be used to power up the device at 414 for emergency functions use only at 418. If no user's interaction is detected, the device assumes no emergency use of the device is needed and simply powers down the device at 416.

Figure 5:
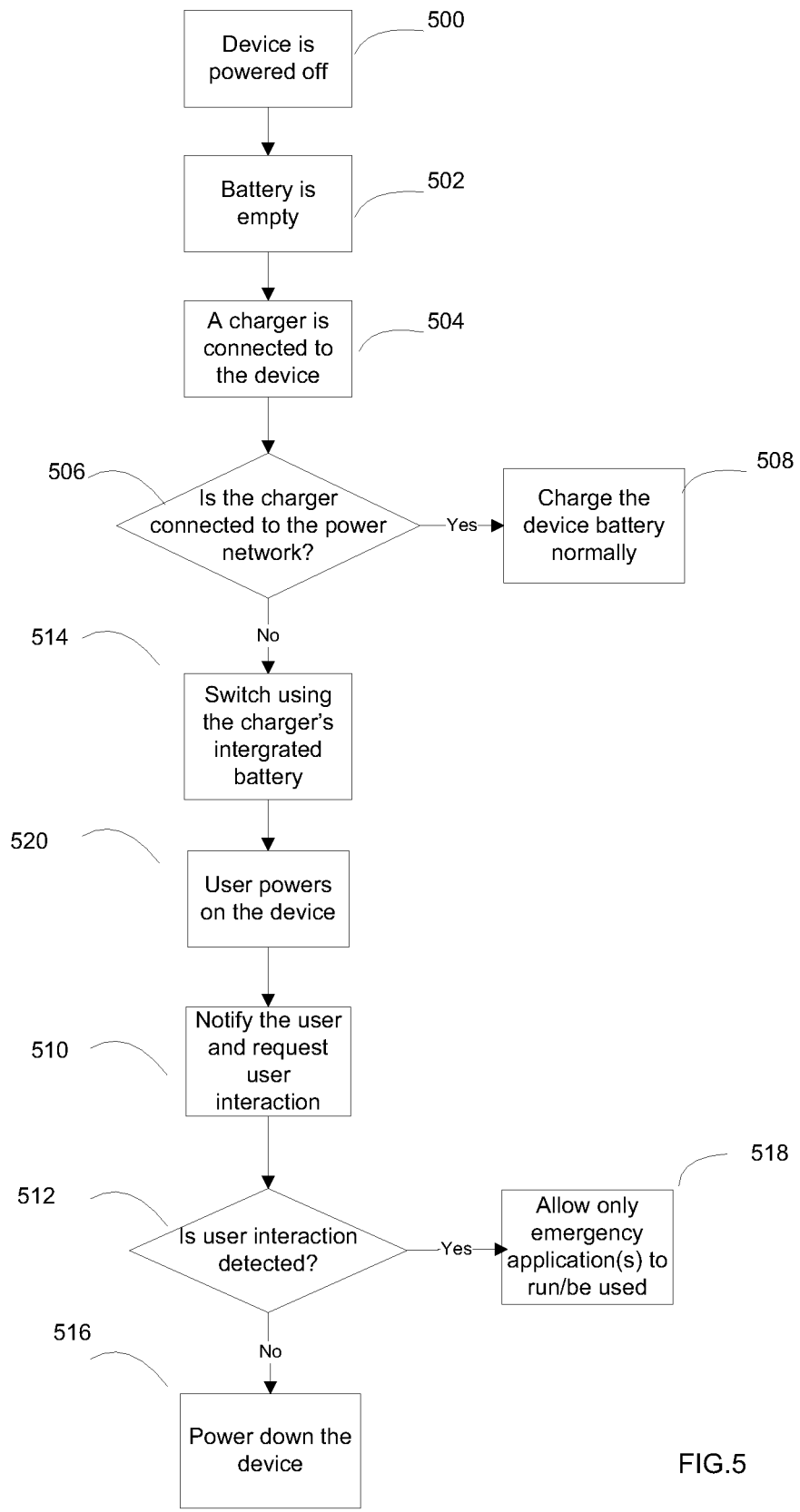
FIG. 5 is a flow diagram showing operations for emergency power supply when an electronic device is powered off and the battery in the device is empty according to an exemplary embodiment.

FIG. 5 is a flow diagram showing operations for emergency power supply when an electronic device is powered off and the battery in the device is empty according to an exemplary embodiment. In a situation that a device with a rechargeable internal battery is powered off at 500, and it is detected that the internal battery is empty at 502, a charger with an integrated emergency battery according to any of exemplary embodiments is connected to the device at 504. The charger or the device detects whether the charger is connected to the power grid at 506 according to any of exemplary embodiments. The device needs to be powered on at 520 if it is used to detect the charger connection to the power grid at 506. If the mains power is available, the charger charges the device battery normally at 508. Otherwise, the power supply lines in both the charger and the device are switched such that the charger's integrated battery can be used to supply power at 514 and user can power on the device at 520. The device further notifies the user the situation and requests a user's interaction at 510. The user's interaction is detected at 512. If the user confirms of an emergency situation, the device is ready for emergency functions use only at 518. If no user's interaction is detected, the device assumes no emergency use of the device is needed and simply powers down the device at 516.

Without in any way limiting the scope, interpretation, or application of the claims appearing below, a technical effect of one or more of the example embodiments disclosed herein is to provide a simple and reliable way to supply power for a rechargeable electronic device in emergency situations, especially when the battery in the rechargeable electronic device is very low or empty and no power is available to charge the battery. The supplied power is enough for running emergency applications. Another technical effect of one or more of the example embodiments disclosed herein is to intelligently control the access to the emergency power supply so that the emergency power is available when needed. Another technical effect of one or more of the example embodiments disclosed herein is to provide a smart charger being able to provide power to a rechargeable electronic device during mains blackout or lack of connection to power grids.

Embodiments of the present invention may be implemented in software, hardware, application logic or a combination of software, hardware and application logic. The software, application logic and/or hardware may reside on the charger 2. If desired, part of the software, application logic and/or hardware may reside on the charger 2, part of the software, application logic and/or hardware may reside on the mobile device 1. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1 or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:
1. An apparatus, comprising:
a transformer coupled to a mains power;
a backup power source comprising a first battery;
a first power supply line switch configured to switch the power source between the backup power source and the mains power;

a connecting interface coupling the power source to an external electronic device comprising a second battery which is rechargeable and a second power supply line switch which is configured such that the external electronic device is able to be powered by either the power source or a second battery; and a charging detector configured to detect the availability of the mains power;

wherein the first power supply line switch is further configured to couple the backup power source to the external electronic device via the connecting interface when the mains power is not available such that the first battery is able to deliver power to the external electronic device.

2. An apparatus according to claim 1, wherein the first battery is a rechargeable battery and the backup power source is coupled to the mains power such that the first battery is able to be charged by the mains power.

3. An apparatus according to claim 2 further comprising a controller configured to control charging or discharging the first battery.

4. An apparatus according to claim 1, wherein the backup power source further comprises a battery protection circuit.

5. An apparatus according to claim 4, wherein the battery protection circuit is a fuse.

6. An apparatus according to claim 1 further comprising a mechanical switch configured to be enabled for supplying power from the first battery to the external electronic device when the mains power is not available and the second battery in the external electronic device is low or empty.

7. An apparatus according to claim 6 configured to run an emergency application only when the mechanical switch is enabled, wherein the emergency application comprises a phone call, a text message or location sharing.

8. An apparatus according to claim 1, wherein the power source is coupled to the external electronic device wirelessly via the connecting interface.

9. An apparatus according to claim 1, wherein the availability of the mains power is determined by the external electronic device and communicated to the charging detector in the connecting interface.

10. An apparatus according to claim 1, wherein the external electronic device is in power saving mode if the power is delivered directly from the first battery in the apparatus.

11. An apparatus according to claim 1, wherein the first battery of the apparatus is replaceable.

12. An apparatus according to claim 1, wherein the first battery of the apparatus is a one cell lithium-ion battery having energy of capacity of at least 100 mAh (milliampere per hour) to 300 mAh.

13. A method, comprising coupling a connecting interface to an external electronic device comprising a second battery which is rechargeable and a second power supply line switched which is configured such that the external electronic device is able to be powered by either the second battery or an external power source, detecting a charging status based partially at least on the availability of mains power coupled to a transformer, and coupling a first battery inside a charger as the external power source to the external electronic device when the mains power is not available.

14. A method according to claim 13 further comprising controlling a mechanical switch configured to be enabled for supplying power from the first battery inside the charger when the mains power is not available and the second battery of the external electronic device is low or empty.

15. A method according to claim 14 further comprising only allowing an emergency application to run when the mechanical switch is enabled.

16. A method according to claim 13 further comprising notifying the user of the charging status and requesting a user's interaction when the mains power is not available.

17. A method according to claim 13 further comprising turning the external electronic device to a power saving mode if the power is delivered directly from the first battery of the charger.

18. A device, comprising:

an internal rechargeable battery;

a charging detector coupled to an external power supply via a connecting interface, wherein the external power supply comprises a transformer coupled to a mains power and a backup power source comprising a battery, the charging detector further configured to detect the availability of the mains power to the external power supply;

an internal power supply line switch configured to couple the backup power source to the device such that the device is able to power up by the first battery inside the external power supply when the mains power is not available, wherein the device is configured to be powered by either the internal rechargeable battery or the external power supply controlled by the internal power supply line switch.

19. A method, comprising detecting an emergency status of a device via a connecting interface to an external power supply based partially at least on the availability of mains power, wherein the external power supply comprises a battery and a transformer coupled to a mains power, and the device comprises a internal rechargeable battery and an internal power supply line switch configured such that the external electronic device is able to be powered by either the external power supply or the internal rechargeable battery; and coupling the battery in the external power supply to the device when the internal rechargeable battery of the device is low or empty and the mains power is not available such that the battery in the external power supply is able to supply power to the device.

20. A computer program product comprising a computer-readable medium bearing computer program code embodied therein for use with a computer, the computer program code comprising:

code for detecting a charger connection for mains power;

code for detecting the remaining power of a rechargeable battery in an external electronic device;

code for controlling power delivery from a battery in the charger directly to the external electronic device for running an emergency application when the mains power is not available and the remaining power of the rechargeable battery in the external electronic device is low or empty, and code for enabling power saving scheme in the external electronic device if the power is delivered directly from the battery of the charger, wherein the charger is coupled to the external electronic device via a connecting interface and said connecting interface is further coupled to the mains power via a transformer.

* * * * *